Feb. 2, 1937.　　H. E. BERGGREN　　2,069,572
COMBINATION LOCK
Filed March 9, 1935　　7 Sheets-Sheet 1
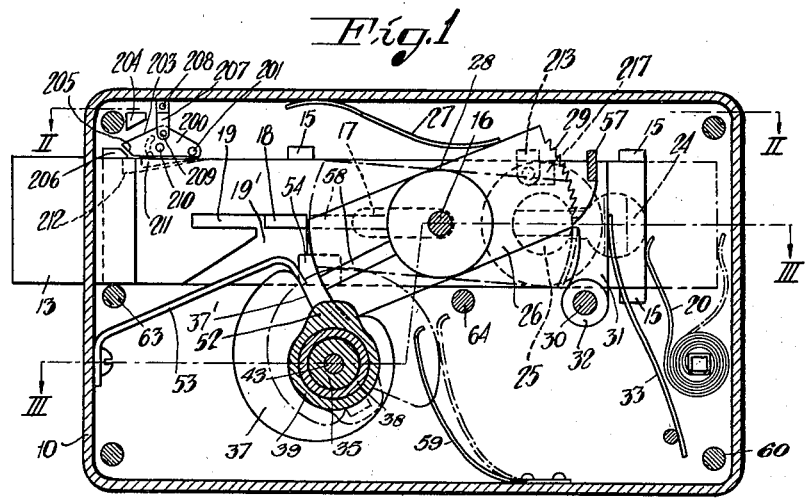
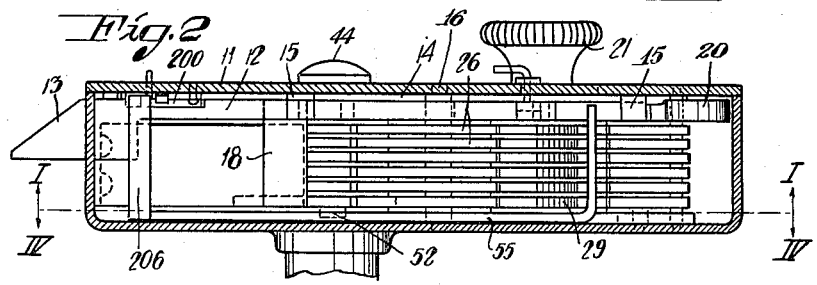
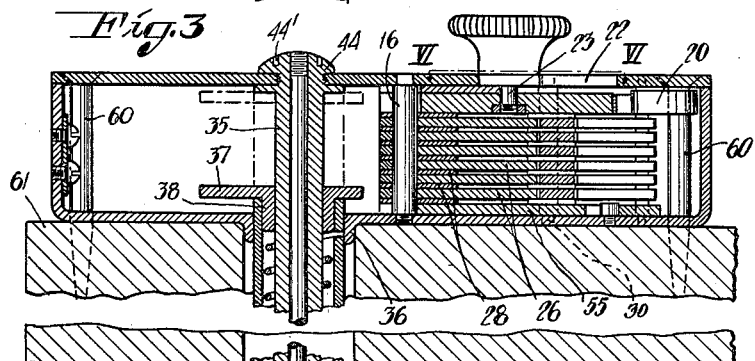
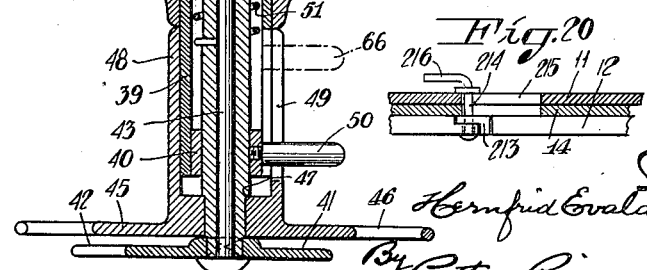
Inventor:
Hernfrid Evald Berggren,
By Potter, Pierce & Scheffler,
Attorneys.

Feb. 2, 1937. H. E. BERGGREN 2,069,572
COMBINATION LOCK
Filed March 9, 1935 7 Sheets-Sheet 2
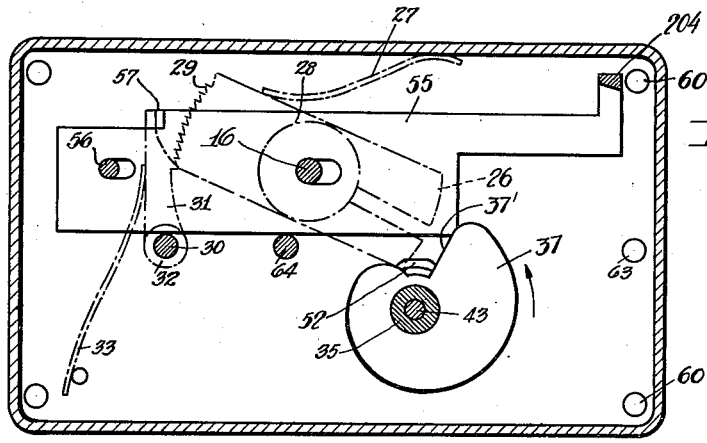
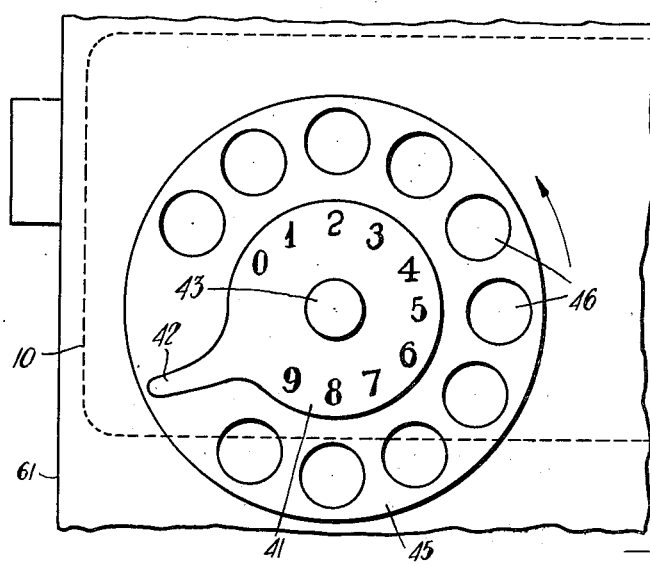
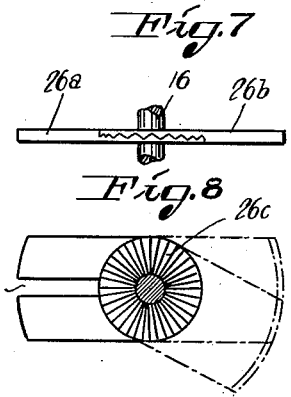
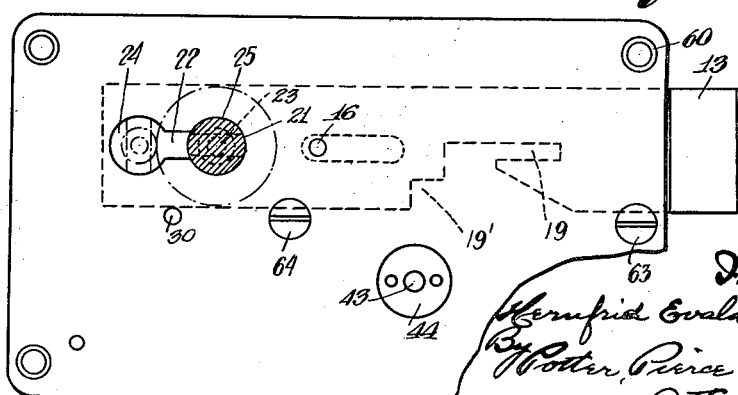

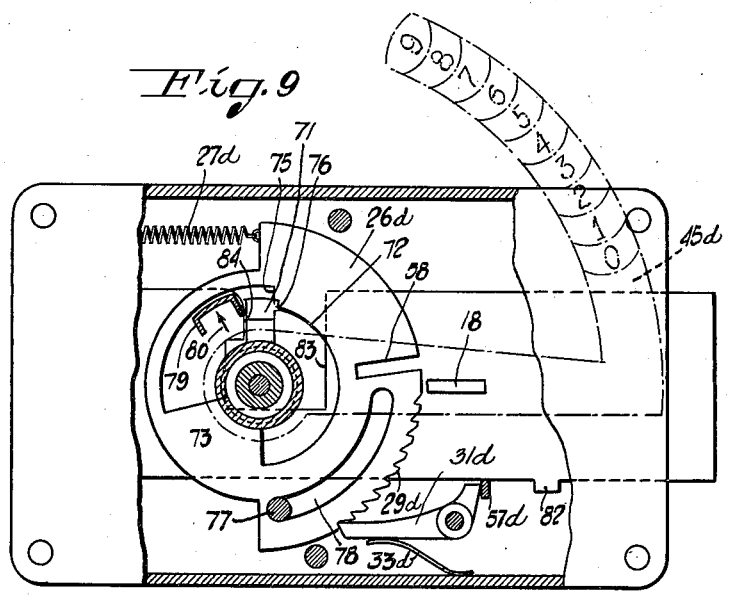
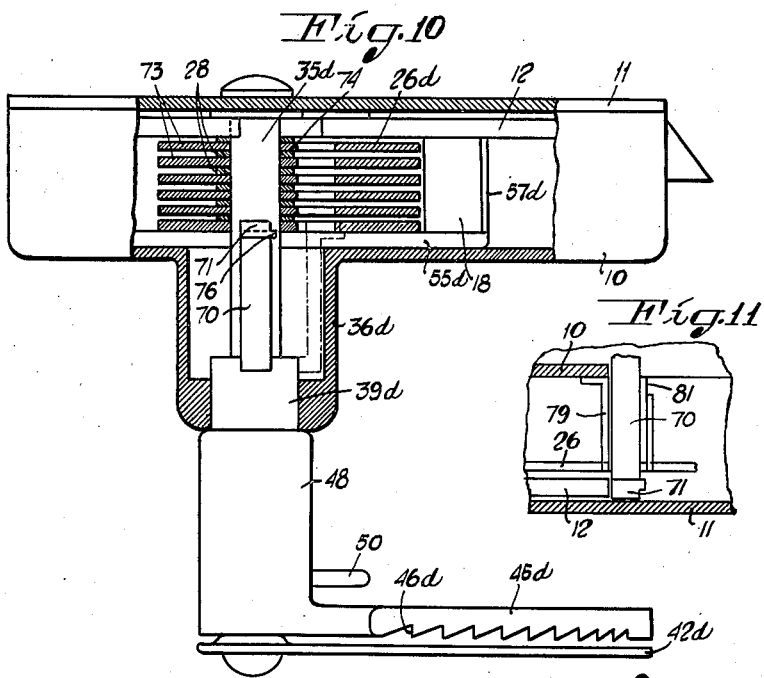

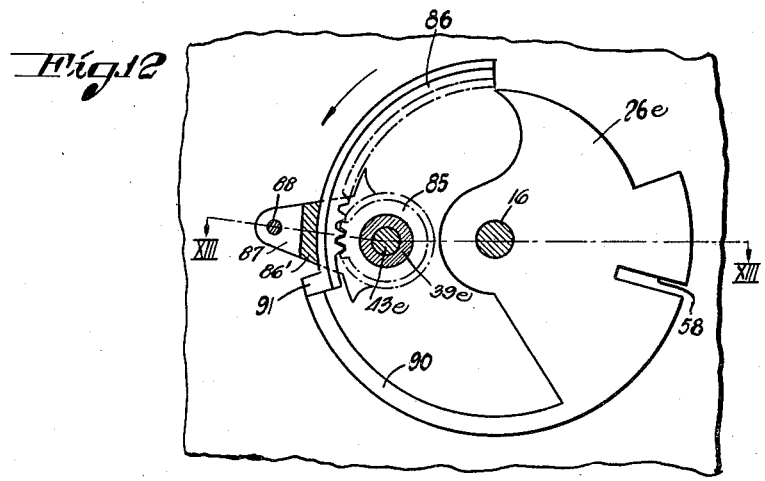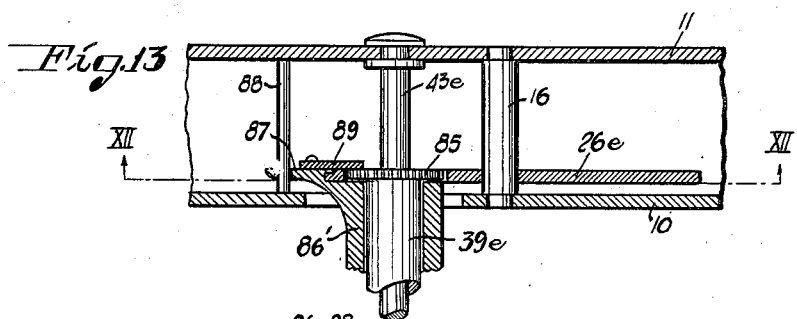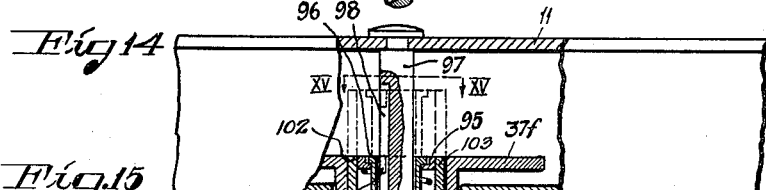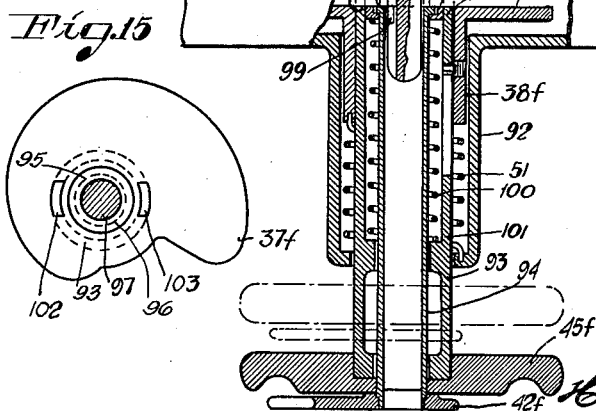

Feb. 2, 1937.   H. E. BERGGREN   2,069,572
COMBINATION LOCK
Filed March 9, 1935   7 Sheets-Sheet 5
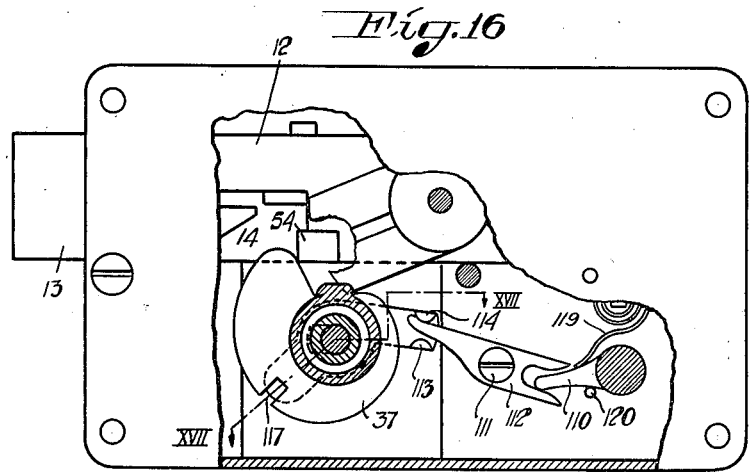
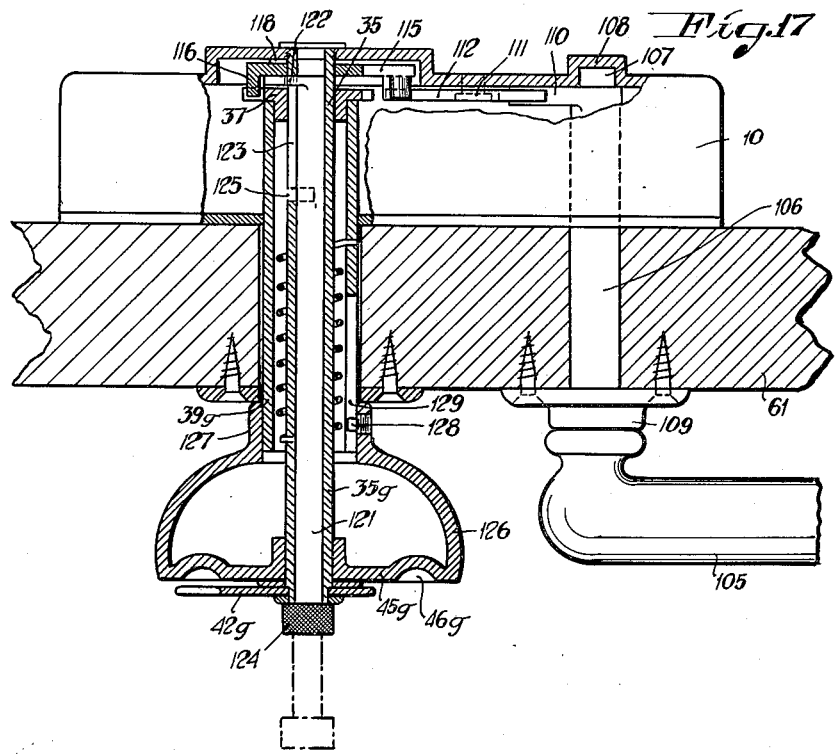

Feb. 2, 1937. H. E. BERGGREN 2,069,572
COMBINATION LOCK
Filed March 9, 1935  7 Sheets-Sheet 7
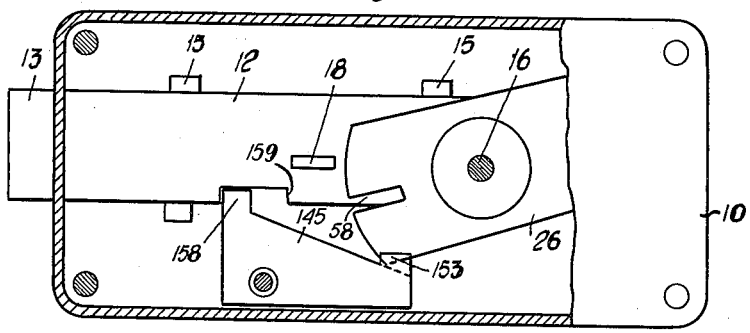
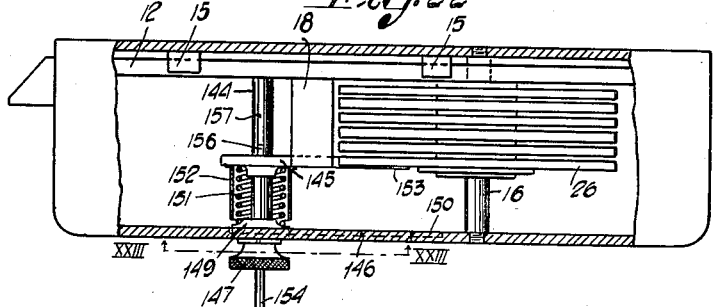
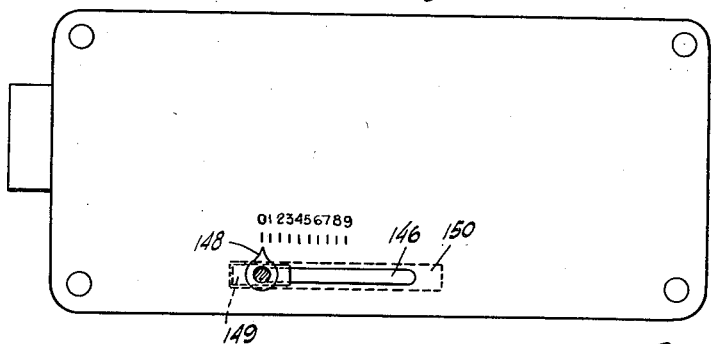

Patented Feb. 2, 1937

2,069,572

UNITED STATES PATENT OFFICE 2,069,572

COMBINATION LOCK

Hernfrid Evald Berggren, Stockholm, Sweden

Application March 9, 1935, Serial No. 10,312
In Sweden March 7, 1934

19 Claims. (Cl. 70—53)

My present invention refers to combination locks, more particularly to combination locks of the type having two regulating or setting movements in the same member, one for operating said member into position relatively to the separate tumblers and the other for operating the tumblers.

The main object of the invention is to provide a lock of the type referred to being operable in an easy and simple manner to those who know the combination of the lock but having so large a number of combination possibilities that the probability for a person, who does not know the combination, to find the correct combination is exceedingly small.

Another object of the invention is to provide a combination lock which will dispense with the use of a key for locking or unlocking, the lock being operable by means of a regulating member permanently arranged in the lock.

A further object of the invention is to provide a simple construction of said regulating member in order that the operation of the lock in putting the correct combination may be easily performed.

Other objects of the invention will appear from the following.

The invention may be applied to locks adapted to a plurality of different purposes, as for instance door locks in houses, locks in writing-tables, document boxes, safes and locks in automobiles for doors as well as the ignition or the gear-box. In a simplified form the invention may also be applied to padlocks and locks for bicycles.

The invention will be best understood by reference to the accompanying drawings forming part of this specification, and in which Figures 1-6 inclusive show an application of the invention to a door lock which can be unlocked from inside the door without operating the tumblers; Fig. 1 is a vertical section taken on substantially line I—I of Fig. 2, which in turn shows a horizontal section on line II—II of Fig. 1. Fig. 3 is a horizontal section on the broken line III—III of Fig. 1. Fig. 4 is a vertical section on substantially line IV—IV of Fig. 2 looking in a direction opposite to that in which Fig. 1 is taken. Fig. 5 shows a side elevation of the regulating member looking from outside the door, the manually operated part of said member, according to the embodiment shown, being constructed substantially as a dial in automatic telephones. Fig. 6 is a side elevation of the lock looking from inside the door, partly in section on line VI—VI of Fig. 3.

Figs. 7 and 8 are detail views showing in elevation and plan view a tumbler according to a modified form.

Figs. 9 and 10 show an elevation and a plan view of another embodiment, the wall of the casing being broken away and the parts being shown partly in sections taken at right angles to the axis of the tumblers in Fig. 9 and in the plane of said axis in Fig. 10. Fig. 11 is a detail view of Fig. 9 looking in the direction of the arrow 80 in said Fig. 9.

Figs. 12 and 13 show details of a modification of the means for actuating the tumblers and fragments of parts cooperating therewith, Fig. 12 showing a view, partly in section, taken on line XII—XII of Fig. 13, which is a section taken on line XIII—XIII of Fig. 12.

Figs. 14 and 15 show a modified form of the regulating member; Fig. 14 is a section taken in the plane of the axis of said member, fragments of the casing of the lock being shown in elevation; Fig. 15 is an end view of the regulating member according to Fig. 14, partly in section taken on line XV—XV in said figure.

Figs. 16 and 17 illustrate a form of construction in which a special handle is arranged in addition to the regulating member; Fig. 16 is an elevation in which a part of the cover of the casing is broken away, the parts exposed thereby being shown partly in section; Fig. 17 is a section taken on line XVII—XVII of Fig. 16.

Figure 18:
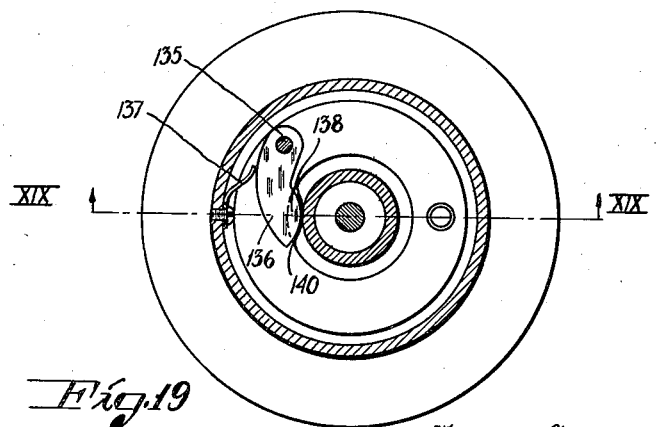
Figure 19:
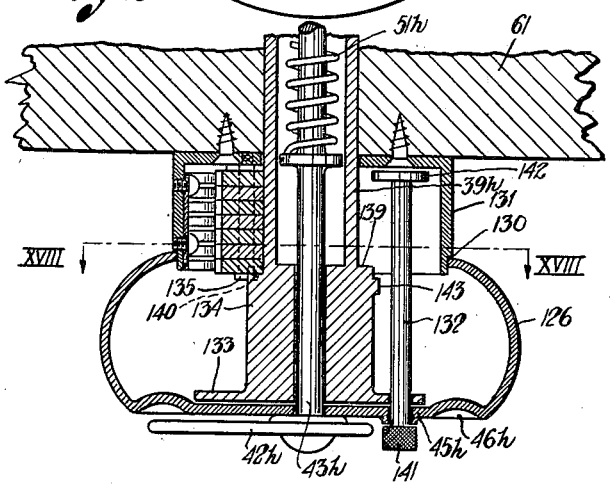

Figs. 18 and 19 are fragmentary views of the regulating member according to a modified form in which special stopping means are provided to control the axial movement of the regulating member, Fig. 18 being a section on line XVIII—XVIII of Fig. 19, which in turn is a section on line XIX—XIX of Fig. 18.

Fig. 20 is a detail view of Figs. 1 and 2.

Figs. 21-23 inclusive show a further embodiment of the invention, Figs. 21 and 22 being partial sections at right angles to the shaft of the regulating member and in the plane of the axis thereof respectively, and Fig. 23 being an elevation partly in section on line XXIII—XXIII of Fig. 22.

In the following description same reference numerals indicate corresponding parts in the various figures.

The form of construction illustrated in Figs. 1-6, inclusive, comprises a suitable casing 10 mounted at the inner face of the door 61 by means of screws 60. The casing 10 is closed by a cover 11 secured to the same by screws 63 and 64. The bolt 12, having its outer end 13 bevelled, is adapted to move longitudinally between guides 15, 15 which also carry and guide a slide-plate 14 slidably mounted between the bolt 12 and the cover 11 of the casing. A transversely extending stem 16 is secured to the cover 11 and the opposite wall of the casing 10, said stem passing through a longitudinal slot 17 in the bolt and the slide-plate 14, permitting the longitudinal movement of the bolt and the slide-plate. Secured to the slide-plate 14 is a projection 18 extending transversely in the casing and passing through a longitudinal slot 19 provided in the bolt 12 in order to enable the bolt to move independently of the slide-plate. The bolt and the slide-plate are held in locking position by a spring 20 acting upon the rear end of the bolt. The bolt 12 can be brought out of its locking position by way of the projection 18, when the slide-plate is forced against the action of the spring 20. As shown in Figs. 1 and 6 the length of the slot 19 is adapted so as to enable the bolt to move out of its locking position without moving the slide-plate in operating the lock by means of a handle or knob 21 secured to the bolt and adapted to slide along a slot 22 provided in the cover 11. The knob 21 is adapted to rotate about a pin 23 secured to the bolt. The portion of the knob 21 extending through the slot 22 is provided with two plane surfaces at opposite sides of the knob so as to enable the knob to be moved along the slot 22 which has a narrow central portion connecting two circular holes 24 and 25 forming part of the slot as will be seen from Fig. 6. Said arrangement enables the bolt to be stopped when being in its unlocking position by rotating the knob 21 about an angle of 90° in the hole 24, and in a similar manner to be stopped in its locking position by rotating the knob 21 in the hole 25. Since the knob is provided inside the door the lock cannot be opened from the outside in the latter case.

Rotatably mounted on the stem 16 are six tumblers 26 all having the same exterior form and the same thickness. At the top edge of each tumbler is secured one end of a spring 27 the other end of which presses against the inner wall of the casing 10 and has a tendency of rotating the tumblers counter-clockwise as seen in Fig. 1. The tumblers 26 are separated from each other by thin spacing members or washers 28 carried by the stem 16. The ends of the tumblers are arc-shaped the arcs being concentric to the axis of the stem 16. One end of each tumbler is provided with a series of teeth 29 at the edge and each of said tooth series or racks is engaged by a pawl 31 pressed against the teeth by a spring 33. The pawls 31 are rotatably mounted on a stem 30 and separated in relation to each other by spacing members 32, and each individual pawl 31 is adapted to engage the teeth 29 of the tumbler positioned in the same plane as the pawl, whereby said tumblers may be stopped in a plurality of different positions. The number of said positions is equal to the number of operating positions to which the regulating member can be moved. In the present case said number is ten, and consequently there are ten teeth at each tumbler.

An important part of the present invention is the regulating member by which the tumblers are operated to move to positions in which they allow the bolt to be moved and the lock to be opened. According to the invention said regulating member is adapted to be operated manually for moving the tumblers to their different positions, but is automatically moved from one tumbler to the following one to be operated. In the form of construction shown in Figs. 1-6 inclusive the automatic movement of the regulating member is a rectilinear movement, the various tumblers being operated by using a rotational movement of the regulating member. To guide the regulating member, the construction of which will be clear from the following description, there is provided a shaft 35 extending transversely through the casing 10 from the cover 11, to which it is secured, outside the casing through an opening surrounded by a flange 36 at the opposite wall thereof. Mounted rotatably and slidably on said shaft 35 is a cam 37 forming part of the regulating member. Said cam has a tubular hub 38 inserted in and secured to one end of a tube 39 the other end of which being provided with a sleeve 40 inserted therein and guided by the shaft 35. In addition to the cam adapted to engage the tumblers, the regulating member comprises manually operable means to effect its rotational movement. Said means consists of a dial of substantially the type used in automatic telephones.

As shown in Figs. 3 and 5 the dial comprises a circular plate 41 provided with numerals and fitted at the square outer end of the shaft 35. A finger stop or abutment 42 extends radially from said plate 41 which is held in position on the shaft 35 by means of a screw 43 extending longitudinally through the hollow shaft and secured to the outer side of the cover 11 by means of a nut 44 provided with suitable key holes 44. Rotatably mounted on the shaft 35 inside the number plate 41 is a plate 45 provided with ten finger holes 46 positioned on a circle concentrically to the axis of the shaft 35. The rotatable plate 45 is prevented from moving axially on the shaft 35 by a shoulder 47 formed integrally therewith, and by the number plate 41. A centrally extending sleeve 48 is provided integrally with the rotatable plate 45 and surrounds the tube 39. At one side said sleeve 48 is provided with an axial slot 49 in which a pin 50 screwed in the tube 39 and the sleeve 40 and extending radially outwards therefrom, is adapted to move axially. In the tubular space between the shaft 35 and the tube 39, a helical spring 51 is positioned, one end of which spring is secured to the shaft 35, the other end being fixed to the tube 39 in such a manner as to tend to turn the tube 39 counter-clockwise and at the same time to force it axially towards the cover 11.

As would have been clear from the above the regulating member comprises substantially two parts which are movable axially in relation to each other, i. e. the cam 37 and the dial for its operation. The tube 39 transferring the rotational movement from the dial to the cam may be considered as integral with the cam and may also be constructed in agreement herewith without departing from the function intended for the cam. As will be described below the dial may also be provided to move axially together with the cam. The cam has a helical sliding surface or edge adapted to cooperate with an edge of the tumblers, and the length of said sliding surface is such as to correspond to all positions of the tumblers, i. e. when the cam has been rotated through an angle corresponding to the total length of the sliding surface, the tumbler engaging the sliding surface has passed through all its positions defined by the teeth 29 and the pawl 31.

In order to arrest the regulating member in effective position to actuate the individual tumblers I provide an abutting means on said member adapted to cooperate with the tumblers to effect said arresting. In the form of construction shown in Fig. 1 said abutting means comprises a projection 52 extending radially from the hub of the cam 37 and adapted to engage in its arresting position the lowermost corner of the tumbler. The radial abutting surface of said projection is positioned relatively to the sliding edge of the cam so as to retain said edge of the cam in alignment with the tumbler to be operated when the said abutting surface engages the face of the tumbler. The width of the helical or sliding surface of the cam 37 is suitably somewhat less than the total thickness of one tumbler 26 and one spacing member 28. In order to arrest the cam 37 in its turning movement under the action of the spring 51 and to hold it in an initial or normal position when being in alignment with a tumbler I provide an abutment 53 in the form of a plate bent downwards at its free edge and secured at the other end to the wall of the casing 10 as shown in Fig. 1. The width of said plate counted in the direction of the axis of the regulating member is equal to the total depth of the tumblers and the washers or spacing members therebetween. However, the cam may be moved some distance beyond the last tumbler towards the cover 11, in which position the front of the cam engages the inner side of the bolt and a projection 54 secured to the slide-plate 14 will stop the cam in its rotation movement. The cam can also be moved a small distance towards the dial beyond the outermost tumbler at this side of the casing. Into said position, the cam will be withdrawn by means of the pin 50 being moved towards the rear of the finger plate 45 of the dial. The rotational movement of the cam 37 is arrested in said position by a sliding member 55 carried and guided by the stem 16 and by a screw bolt 56 as shown in Fig. 4. Said member 55 is separated from the adjacent tumbler and pawl by a spacing member of the same shape and thickness as those of the washers 28 and 32. Extending at right angles transversely to the sliding member 55 and secured to the top edge thereof is a releasing member for the pawls 31 in the form of a bar 57 positioned in front of the top of the pawls 31 so as to enable all of the pawls to be disengaged from the racks 29 at the ends of the tumblers by moving the sliding member 55 in a direction towards the pawls, so that the tumblers will return by action of their springs 27 to the initial position shown in Fig. 1 in which position the bottom corners of the tumblers engage the hub of the cam 37. Said corner of each tumbler will nearly touch in said position the portion of the helical surface of the cam positioned next to the centre thereof when the cam is in its initial angular position defined by the abutment 53. When the tumblers are in their initial position, the top surface of the projection 18 is on a level with their top edges without touching them but is prevented by the tumblers from moving from its locking position. This cannot occur until each individual tumbler is put in such position as to have a radial notch in the edge thereof situated in alignment with the projection 18. Such a notch 58 is shown in Fig. 1 in the tumbler 26 appearing in said figure.

In order to retard the cam 37 in its return after putting the tumbler in position a retarder may be arranged in a suitable manner. For instance, a leaf spring 59 shown in Fig. 1 will do for said purpose. The spring 59 should extend transversely through substantially the entire width of the space in the casing, and is adapted to engage the helical edge of the cam 37 when said cam has turned through a predetermined angle from its initial position. The pressure of the spring against the cam and thus the retarding action thereof will increase as the cam turns from its initial position.

The manner of action of the lock according to the embodiment now described is as follows.

The invention also includes means to prevent opening the lock and the door by forcing the outer or engaging portion 13 thereof back, for instance by means of a chisel inserted between the door and the door-post. As shown in Figs. 1 and 2 said means comprises a stopping member 200 pivoted at 201 on the wall of the casing. The free end of said member has an upper bevelled surface 203 adapted to be engaged by a transverse bar 204 fixed to or integral with the above-mentioned sliding member 55, and a lower bevelled surface 205 adapted to be engaged by an upstanding projection 206 on the top edge of the slide-plate 14. A leaf spring 207 secured to the wall of the casing at 208 is adapted to keep the stopping member in a lower position determined by a swell 209 thereon engaging a depression in the stopping member as shown in Fig. 1 or an upper position in which said swell engages a similar depression 210 in the stopping member. A projection 211 of the member 200 extends downwards to engage a recess 212 in the upper edge of the bolt. In operation the projection 211 prevents the bolt from being forced back by cooperation with the forward edge of the recess 212. In opening by way of the slide-plate 14, the projection 206 engages the bevelled surface 205 of the member 200 forcing said member upwards into a position, in which the projection is above the top edge of the bolt so that the bolt may be moved by proper operation of the lock. The member 200 will be retained in said upper position by the spring 207. If desired to return the member 200 to its stopping position from outside the door, the cam of the regulating member should be set in a position to cooperate with the sliding member 55 as shown in Fig. 4 and turned counter-clockwise as seen in said figure, so that the sliding member 55 will be forced back and the end of the transverse bar 204 will engage the upper bevelled surface 203 of the member 200 forcing it downwards.

Furthermore, the invention includes means to release the pawls of the tumblers automatically when the bolt is forced back in shutting the door. Said means may be manually operable from the inner side of the door so that it can be brought out of action in case the lock is to be retained in unlocked position for a long period of time. As shown in Figs. 1, 2 and in detail in Fig. 20 said means consists of a dog 213 fixed to a shaft 214 rotatably mounted at the top edge of the bolt 12. The shaft 214 extends through slots 215 in the slide-plate 14 and the wall 11 of the casing and has an integral handle 216. The dog 213 may be set to extend above the edge of the bolt as shown in Fig. 1 or, by turning it 90°, to be received by a recess 217 in the bolt. In its former position, the dog will engage the releasing bar 57 in case the bolt would be moved back so as to disengage the pawls 31; in its latter position the dog will not actuate said bar and the lock will remain in open position.

In order to move the bolt out of its locking position all tumblers 26 must at first be put in a position so as to have their notches in registry mutually and in relation to the projection 18. In Figs. 1, 2 and 3, the tumblers 26 and the cam 37 are shown in their initial position in full lines, the cam being in effective position in relation to the first tumbler counted from the dial, and is prevented by the abutment 52 on the hub of the cam from passing said tumbler under the action of the spring 51. Suppose that the number of the combination is 603,915. In order to operate the tumblers according to said combination the operator has to insert the point of his finger in that hole in the fingerplate of the dial which is positioned at the numeral six on the number plate 41, the finger plate being turned counter-clockwise until the finger will stop against the abutment 42. At the beginning of the rotational movement, the abutment 52 on the hub of the cam will become free from the bottom edge of the first tumbler but since the cam has now been turned a certain angle the edge thereof will abut against the second tumbler when the cam is forced axially under the action of the spring 51. The extent of said axial movement of the cam is thus relatively small being equal to the thickness of the spacing member between the first and the second tumbler. The face of the cam will thus engage the second tumbler and slide along the face thereof without turning the tumbler at the further movement of the cam, the pressure of the spring engaging the pawl at the second tumbler being large enough to retain said tumbler in position. As the cam is turning, the helical edge thereof will force the first tumbler against the action of the spring 27 to the position six, in which the notch 58 is in registry with the projection 18. The first pawl 31 will retain the tumbler in said position. The dial is released by the finger and the cam will return to its initial position under the action of the spring 51. In the initial position the edge of the cam is disengaged from the lower edge of the second tumbler, and the cam will thus move axially until the abutment 52 will be arrested by said tumbler. The operator will now take the numeral 0, whereby the second tumbler will be turned only to such an extent as to allow the cam to pass the lowermost corner of said tumbler. The notch 58 of said tumbler is thereby turned to obtain a position in registry with the projection 18 as shown in dotted lines in Fig. 1. It will be seen that when the cam has obtained its initial angular position, the top surface of the abutment 52 is just able to pass closely below the second tumbler being in its nought position, to proceed to effective position in relation to the third tumbler. The remaining tumblers are operated similarly by taking the numerals 3, 9, 1 and 5 successively on the dial. After setting the last tumbler and returning to its initial angular position, the cam has passed the said tumbler and will rest at its radial edge 37' against the projection 54 of the sliding plate 14. It is now possible to move the bolt 12 out of locking position by using the finger plate 45 as a handle and turning it clockwise, the radial edge of the cam engaging the projection 54 of the sliding plate 14 and forcing it together with the bolt by way of the projection 18 out of locking position. The inwardly directed portion of the projection 18 will slide at this movement into the registering notches of the tumblers. After opening the door 61 the bolt is permitted to return to its initial or locking position under the action of the spring 20, the finger plate at the same time returning to its initial angular position. The pin 50 now obtains the position indicated by 66 in Fig. 3. To return the cam to its initial axial position and to release the tumblers from the pawls engaging the teeth at the rear thereof, the operator moves by a finger the pin 50 towards the dial to such extent as to engage the pin with the end of the slot 49 obtained in the sleeve 48 of the rotatable plate 45. The radial edge 37' of the cam will now engage the lower corner of the sliding member 55 as shown in Fig. 4 of the drawings. By turning the rotatable plate 45 counter-clockwise in Fig. 4 through a small angle the sliding member 55 may now be moved a distance sufficiently to release by means of the bar 57 the pawls and the tumblers which will return by the action of the springs 27 to their initial position shown in dotted lines in Fig. 4. The dial and the pin 50 are now released, the latter being returned by means of the spring 51 to its initial position shown in full lines in Fig. 3. The bolt is now in its locking position again and the door may be shut. At shutting the door the bevelled face of the bolt will be forced back into the casing, this movement being permitted in spite of the tumbler being in locking position because the bolt is free to move independent of the sliding plate 14 and the projections 18 and 54 thereof due to the slot 19 and the downward extension 19' thereof in the bolt. The manner of opening the lock from inside or outside the door and of stopping the lock in locking or unlocking position is already described above.

It will be clear from the above that the lock according to the present invention is of such construction as to avoid any possibility of concluding the correct position of the tumblers by feeling or listening. As a matter of fact the projection 18 does not engage any tumbler when they are being put in position, and the projection 18 cannot possibly be forced against the tumbler when being in incorrect position until all tumblers have moved out of their initial or normal position.

It is to be noted that the combination of the lock is defined by the angular position of the notches on the tumblers. In the form of construction shown in Figs. 1–6 inclusive the combination may be changed only by removing the tumblers from the lock and substituting them by others having the notches in other positions. However, it is also possible to provide each notch in a separate part of the tumbler, said part being adapted to be set on the remaining part of the tumbler in a number of positions corresponding to the numerals at the dial. This possibility is illustrated by way of example in Figs. 7 and 8, in which a tumbler is divided in two portions 26a and 26b adapted to be set in different angular positions in relation to each other. The portion 26b may thus obtain positions as illustrated in dotted lines in Fig. 8. The portion 26a having the notch 58 and the portion 26b having the tooth rack 29 are each provided at the centre with a surface 26c having radial undulations adapted to keep the portions 26a and 26b in a definite angular position in relation to each other when compressed in direction of the axis of the stem 16 on which they are mounted loosely. Although only one tumbler is shown in Figs. 7 and 8 it is evident that a plurality of such tumblers may be mounted as shown in Figs. 2 and 3, for instance, the various tumblers cooperating to retain their portions in correct relation to each other.

In order to save space and reduce the outer dimensions of the lock the tumblers may be mounted concentrically to the longitudinal axis of the regulating member and the remaining parts of the lock may be modified in regard thereto. An example of such arrangement of the tumblers is shown in Figs. 9–11 inclusive. According to said modification the tumblers 26d have the form of circular disks mounted loosely on the hollow shaft 35d on which the tumbler actuating portion of the regulating member is adapted to move axially as described in connection with the former embodiment of the invention. Instead of a cam for the operation of the tumblers an angular arm 70 may be secured to the tube 39d of the regulating member, the free end of which arm has a radial projection 71 adapted to cooperate with the tumblers to turn them out of their normal or initial positions. In order to realize the axial movement of the regulating member in spite of the fact that the tumblers are mounted on the same shaft 35d as the regulating member, each tumbler disk is provided with an opening 72 extending through a substantial arc so that only a small sector 73 and a hub portion 74 are left to carry the tumbler disk on the shaft 35d. At a point of the circumference said opening 72 forms a radial shoulder 75 adapted to be engaged by the projection 71 of the angular arm 70. A lateral abutment 76 formed integrally with the projection 71 overlaps the tumbler adjacent to said shoulder 75 so as to arrest the regulating member in effective position in relation to the tumbler. At the arc-shaped periphery each tumbler has a tooth rack 29d engaged by a pawl 31d forced against said rack by a spring 33d as in the former embodiment of the invention. A spring 27d having one end secured to the tumbler disk at a suitable point and the other end carried by the wall of the casing 10 tends to turn the disc 26d counter-clockwise in Fig. 9, said movement being limited by a pin 77 extending transversely through the inner end of the casing, and an arc-shaped slot 78 in the tumbler adapted to receive said pin 77, said pin may be fixed to the wall of the casing. The length of the slot 78 corresponds to the length of the tooth rack 29d so that when in turning the disk, all teeth 29d have passed the pawl 31d, the slot has passed the pin over its whole length. A notch 58 adapted to receive the projection 18 is arranged in correspondence to the embodiment described in connection with Figs. 1–6 inclusive. However, according to the present embodiment the lock is not adapted to be operable from the inner side of the door so that no slide-plate is needed, the projection 18 being secured directly on the bolt 12. The latter is provided with a large recess 83 to receive the projection 71 of the regulating member in its effective position to operate the bolt. In said position the projection 71 engages an edge 84 of said recess being forced thereagainst by the spring of the regulating member. A channel-shaped guiding member 79 shown in section in Fig. 9 and in elevation in Fig. 11 is secured to the wall of the casing opposite to the cover 11 as shown in detail in Fig. 11. It is to be noted that Fig. 11 shows the channel 79 as seen in direction of the arrow 80 in Fig. 9 and that Fig. 11 is a fragmentary showing of portions of the cover 11, the opposite wall of the casing 10 carrying the channel, the bolt 12 and one tumbler 26d adjacent to the bolt. The channel 79 is open at both ends, the projection 71 of the angular arm 70 being received in the channel after operating all tumblers. The projection 71 enters the channel at the end adjacent to the bolt 12 to be moved in said channel to the opposite end thereof where it may escape through a lateral opening 81 formed by cutting out the left hand flange of the channel at the end thereof, as seen in Fig. 11. It will be seen that the channel serves as an abutment for the projection 71 when said projection is in its effective position outside the channel as will be clear from Fig. 9 in which the angular arm 70 and its projection 71 tend to turn counter-clockwise under the action of the spring of the regulating member. Said spring may of course be of the same construction as the spring 51 shown in Fig. 3 and is to be mounted in the tube 39d as shown in said figure.

Instead of a circular dial for operating the regulating member the manually operable part of said member consists of an arc-shaped member 45d connected to the sleeve 48 by a radial arm integral with both said member 45d and the sleeve 48 as shown in dotted lines in Fig. 9 and in full lines in Fig. 10. The arc member 45d has ten shoulders 46d corresponding to the finger holes in the former embodiment and adapted to be engaged by the finger when operating the lock. This arrangement has the advantage as compared with the dial described above that the finger positions or shoulders may be distributed over a relatively small angle that is suitable in the present case since the tumblers must be turned the same angle as the regulating member. The arc-shaped member is adapted to be operated in connection with a fixed finger stop similar to that described above. It is to be noted, however, that the numbers of the various finger positions are provided at the movable member 45d instead of the stationary member 42 of the dial mentioned above.

The pawls 31d engaging the teeth 29d of the tumblers may be released by means of the cross bar 57d of the sliding member 55d. For that purpose the lower edge of the bolt 12 has a shoulder 82 adapted to engage the releasing bar 57d at the end of an unlocking stroke of the bolt, i. e. when the projection 18 is received by the notches in the tumblers.

The operation of the embodiment now described is similar to that of the previous one and need not be described in detail. The regulating member is, in the position shown in full lines in Fig. 10, in its initial position in which the abutment 76 of the projection 71 engages the face of the first tumbler at the radial shoulder 75, whereby the regulating member is prevented from moving axially under the action of its spring. In taking a certain numeral at the arc-shaped operating member 45d, the projection of the angular arm 70 turns the first tumbler a corresponding angle to a position in which the tumbler is retained by the pawl 31d. When the operating member 45d is released, the angular arm will return under the action of the spring of the regulating member, until the projection 71 engages and is arrested by the lateral flange of the channel-shaped guide 79. In the initial part of said movement the abutment 76 will be disengaged from the tumbler at the shoulder 75 and will move axially to engage the next tumbler, on which the projection 71 will slide, until it reaches the shoulder 75 of the tumbler in question, whereas it is moved axially until it is arrested by the abutment 76. The same process will be repeated at the remaining tumblers. When the last tumbler has been set in position, the projection 71 of the regulating member slides into the recess 83 in the bolt and will engage the edge 84. Supposing that all tumblers have been set in correct position, the lock may be opened by turning the regulating member counter-clockwise, the arm carrying the arc-shaped member 45d serving as a handle. The bolt will then be forced out of locking position by the projection 71 of the arm 70. When the bolt has returned, the projection 71 obtains the position shown in Fig. 11 in alignment with the end of the channel-shaped guide 79. By means of the pin 50 the axially movable part of the regulating member, i. e. the arm 70 and the tube 39 will be returned to their initial axial position, the projection 71 being guided by the channel 79 without contacting the tumblers or the edges of the openings 72. The projection 71 will move through the lateral opening 81 out of the channel-shaped guide at the end of the axial returning movement and is then set in correct position in relation to the first tumbler, i. e. will obtain the position shown in Fig. 9.

Instead of transmitting the movement of the regulating member to the tumblers by means of a cam or an angular arm it may be suitable in certain cases to use a gear transmission to effect said movement. Figs. 12–13, inclusive, show such an arrangement diagrammatically, such portions being included only as are needed for a comprehension of the construction and operation of the gear transmission proper, in that the remaining parts of the lock may be constructed as shown in connection with any of the previous embodiments. The tumblers 26e of which one only is shown are loosely mounted on a stem 16 which is parallel with and arranged laterally of the screw 43e which in analogy with Fig. 3 supports the fixed part of the regulating member, that is to say the abutment or stop for the finger plate. Instead of a cam-disk, such as shown in Fig. 3, the tube 39e is provided at its inner end with a toothed wheel 85 fixed thereto for engagement with racks 86 of the tumblers 26e. Tube 39e is rotatably mounted in a sleeve 86' that has a radial arm 87 provided with a hole through which extends a screw 88 extending entirely through the lock and being fixed to the walls of the casing of the lock. The supporting member 89 which is removably fixed to the arm 87, extends radially over and above the end surface of the toothed wheel 85. The tube 39e and the toothed wheel 85 fixed thereto may thus be turned in relation to the sleeve 86' but cannot be moved axially in relation to the latter. One end surface of the toothed rack 86 abuts the end of an arc-shaped part 90 of the tumbler 26e in a manner as shown in Fig. 12. It may be supposed that the tube 39e is actuated in the same manner as was the case in the embodiment shown in Fig. 3 by means of the spring of the regulating member and therefore it tends to move axially toward the interior of the lock. In order to obtain a stepwise movement from one tumbler to the next, that end of the toothed rack 86, which abuts the arc-shaped part 90 of the tumbler 26e may be provided with a stop 91 in the same way as the bell-crank or angular arm in the preceding embodiment. The rotary movement of the tube 39e may be effected by means of the finger plate or the like. Rotary movement imparted to tube 39e by the finger plate is transferred by the wheel 85 to the rack 86 of the tumbler, so that this latter is rotated a certain angle corresponding to the setting angle of the finger plate. The mode of operation is analogous with what has been described in connection with the preceding embodiment, and therefore it need not again be explained in this connection. It is obvious that a guide for returning the projection 91 in axial direction after the setting of all tumblers may be arranged in the same way as shown in connection with the projection 71 in Figs. 9 and 11.

Instead of carrying out the regulating member in two parts one of which, that is to say the operating part, is stationary in axial direction and the other is displaceable in axial direction for the purpose of setting the same into operative position in relation to the respective tumblers, the regulating member may be executed so as to have its operating part, that is to say the finger plate and the finger stop cooperating therewith, capable of moving axially and of partaking in the movement from one tumbler to the next.

Such an embodiment of the regulating member is illustrated in Figs. 14 and 15. In this case the regulating member is arranged in a tubular flange 92 projecting from the wall of the housing, in which flange it is displaceable axially. The finger plate 45f is fixed to a tube 93 which extends through said flange 92, and at the inner end of which the sleeve 38f supporting the cam disk 37f is displaceably mounted. The finger stop 42f is fixed to the outer end of a tube 94 arranged concentrically within the tube 93. The spring 51 for rocking and pushing the regulating member and which is mounted in the space between the tubular flange 92 and the tube 93, is attached with one end to the outer end of the flange 92 and with the other end to the sleeve 38f supporting the cam disk 37f. The cam disk 37f is provided with an angular flange or shoulder 95 extending radially within the sleeve 38f against which abuts a corresponding shoulder 96 on the inner end of the tube 94. In order to prevent the finger stop 42f from partaking in the rotary movement of the finger plate 45f the tube 94 supporting the finger stop is guided at its inner end by a stud 97 fixed to the cover 11 of the housing 10, which stud is provided with a longitudinal groove 98 into which extends a projection on the inner side of the tube 94. It is obvious that the cam disk 37f, the tube 93 with the finger plate 45f and the tube 94 with the finger stop 42f may be moved uniformly as a unity from the extreme outer position shown in Fig. 14 towards the interior of the housing. If the cam disk would have been securely fixed to the tube 93, that tumbler, against which the cam disk at that particular moment abuts in axial direction, may easily be damaged by shocks on the finger plate and the finger stop. In order to reduce the effect of such shocks, a shock absorbing spring 100 is inserted between the inner flange 95 of the cam disk and an inner shoulder 101 on the tube 93, the cam disk 37f together with its sleeve 38f being axially displaceable in relation to the tubes 93 and 94. In order that the inner end of the tube 93 may go past the inner flange 95 of the cam disk 37f, the tube is cut away at two places, so that two longitudinal portions 102 and 103 only remain in diametrically opposite relation, and for these portions corresponding slots or recesses are arranged in the flange 95 of the cam disk (see the detail in Fig. 15). If the operating part of the regulating member is pushed inwards from the position shown in Fig. 14 with full lines to the position shown with dotted lines, and if the cam disk 37f is prevented from moving axially by any of the tumblers, the portions 102 and 103 on the inner end of the tube 93 will move through said openings and together with the inner end of the tube 94 will project on the inner side of the cam disk, such as shown with dotted lines in Fig. 14.

In the forms of embodiment hitherto described, the regulating member for the tumblers has also served as the handle for operating the bolt of the lock. In certain cases it may be preferable to arrange a separate handle by means of which the lock and the door may be opened upon the tumblers having been set into the correct position by means of the regulating member. It is then necessary to make the handle independent of the tumblers, so that it is impossible during the setting of the tumblers by feeling with the handle to gather when a tumbler is set into the correct position. The handle shall, expressed in another way, not be able to actuate the tumblers during the setting of the latter and further it shall actuate the locking bolt only after all the tumblers have been set. For this purpose in a preferable form of embodiment of the invention there is a motion transporting device between the handle and the regulating member, which device couples together the handle and the regulating member, after the latter upon the setting of the tumblers has reached operative position in relation to the lock bolt. This embodiment of the invention is shown in Figs. 16 and 17 which also give an example of a central restoring device for the part of the regulating member which actuates the tumblers, the said restoring device being intended to replace the laterally projecting pin 50 in the embodiment shown in Figs. 1—6.

In the embodiment shown in Figs. 16 and 17 the shaft 106 of the handle is rotatably mounted at its inner end by means of a journal 107 in a recess 108 in the wall of the casing 10. By means of a washer 109 fixed to the door 61 the handle is kept in position axially. At the inner end the shaft 106 has fixed thereto a radially projecting arm 110 which engages the fork-shaped end of a rocking arm 112 mounted by means of a pivot 111 on the wall of the housing, the other end of said rocking arm extending between a pair of projections 113, 114 provided with rounded working edges and arranged on one end of a lever 115 which is pivoted on the tube 35g fixed to the wall of the casing and serving as a guide for the regulating member. The other end of the lever 115 is provided with a projection 116 extending towards the interior of the casing and adapted to cooperate with a corresponding recess 117 in the cam disk 37 of the regulating member. In order that the cam disk may be set in correct position axially in relation to the lock bolt, the lever 115 is set back in a recess in the wall of the casing. A washer 118 separates the lever from the inner wall of this recess. A spring 119 which actuates the arm 110 formed on the shaft 106 of the handle, tends to press the opposite side of the arm against a stop pin 120, whereby the handle and the parts affected thereby are kept in a certain definite position.

For the purpose of restoring the cam disk upon the tumblers having been set, a restoring rod 121 is mounted axially displaceably in the stationary tube 35g. At the inner end this rod is provided with a shoulder 122 which projects through a longitudinal slot 123 in the tube 35g and extends further somewhat beyond the inside of the cam disk. At the outer end the rod 121 is provided with a knob 124 which serves as an operating handle. When drawing out the rod by means of the knob 124, the shoulder 122 moves in longitudinal direction of the slot 123 and thereby carries along the cam disk. A slot 125 in the tube 35g branching off the slot 123 permits the rocking of the rod a certain angle, when the same has been drawn out to its extreme position, when the shoulder moves into the branch slot 125, so that the restoring rod and thereby also the cam disk are locked in the extreme outer position. The cam disk 37 is fixed as before to an axially displaceable tube 39g which with a certain space surrounds the stationary tube 35g. In this space is arranged the spring of the regulating member. One end of the spring is fixed to the interior of the axially displaceable tube 39g and the other end is fixed to the stationary tube 35g. The finger plate 45g having recesses serving as grasping means 46g is formed with a substantially spherical part 126 extending backwardly from the outer periphery, which part at the back passes over into a tubular flange or stud 127 surrounding the outer end of the tube 39g, in which stud the tube may move axially. In order to be able to carry along the tube 39g when the finger plate is rocked this latter is provided with a pin 128 screwed into the stud 127 which pin extends into a longitudinal slot 129 in the tube 39g. The finger plate 126 is prevented from moving on the tube 35g, by means of the finger stop 42g fixed to the outer end of the latter. When the cam disk and the tube 39g supporting the same move axially outwardly from the position shown in Fig. 17 against the action of the spring, the outer end of the tube 39g is moved into the hollowness of the spherical part 126 of the finger plate.

The mode of operation of the embodiment just described is as follows: If it is supposed that all tumblers are set into the correct position and when the cam disk has just set the last tumbler, it is moved backwards to its initial angular position in which the recess 117 in the cam disk lies opposite to the projection 116 on the lever 115, so that the cam disk may move axially and the projection 116 will engage with the recess 117. Now the cam disk is in engagement with its radial edge with the projection 54 carrying along the lock bolt. When now the handle 105 is rocked in clockwise direction, the arm 110 will move the rock arm 112 in counter-clockwise direction, so that the lever 115 and thus also the cam disk are moved in clock-wise direction according to Fig. 16 and the bolt is moved out of locking position. It is to be observed that any such possibility to open the lock by means of the handle in the manner just described will not exist, until the projection 116 will engage the recess 117 of the cam disk, for before this occurs, the movement of the handle cannot be transported to the lock bolt, in that this movement may only be transmitted by the cam disk. In order to restore the cam disk to its axial initial position, it is only necessary to draw out the button 124, so that it occupies its outer position, as shown with dotted lines in Fig. 17.

It is obvious that the lock according to this embodiment may also be provided with shoot-bolts operable from the inside or the outside of the door in order to lock the lock bolt in locked or unlocked position. For the sake of simplicity such shoot-bolts have not been shown in Figs. 16 and 17, because their construction is disclosed in previous figures and it is clear to the professional man in which way they should be applied to the embodiment just described.

In the embodiments of the invention hitherto described the regulating member is kept in operative position for the various tumblers by means of a stop arranged on the regulating member, which stops abuts the tumbler to be set. The tumblers themselves thus serve as stop members for the axial movement of the regulating member. It is, however, possible to arrange separate stop members which independently of the tumblers successively stop the regulating member in the various positions and which afterwards are moved out of stopping position as the regulating member is moved in axial direction. An example of such a device is shown in Figs. 18 and 19, in which such parts of the regulating member are shown which are necessary to understand the construction of the device, in that the rest of the lock may be executed in some of the ways illustrated in the embodiments hitherto described.

The finger plate 45h is also in this case formed with a hollow part 126 which accommodates the outer end of the axially settable tube 39h. The finger plate 45h is prevented from moving axially outwardly by means of the finger stop 42h fixed to the stationary screw 43h and is prevented from moving inwardly by means of a shoulder 130 on a cylindrical sleeve 131 which is mounted concentrically relative to the screw 43h and the tube 39h and is attached to the outside of the door 61. In order to carry along the tube 39h in its rotary movement the finger disk is provided with a pin 132 extending into the hollow, which pin passes through a radial flange 133 arranged on a cylindrical extension 134 on the outer end of the tube 39h. The pin 132 is displaceably mounted in the finger plate and is provided, at that end which projects from the finger plate, with a knob 141, and at its inner end with a radial circular flange 142 to cooperate with a projection 143 on the extension 134. On a shaft 135 fixed in the cylindrical sleeve 131 are loosely mounted a number of stop pawls 136 each of which is kept by a spring 137 pressed against the outside of the tube 39h. The number of stop pawls corresponds to the number of positions in which the regulating member is stopped. Each stop pawl is provided with a rounded shoulder 138 to cooperate with the tube 39h or the extension 134 of the latter. The tube 39h passes into the extension 134 by means of a radial shoulder 139. This latter extends around the circumference of the tube 39h and is at a certain place of the circumference provided with an axial recess 140, the axial depth of which is equal to half the thickness of a stop pawl. In the position shown on the drawing the first or outermost stop pawl 136 engages by means of its rounded shoulder 138 the recess 140 and the stop pawl lies with half its thickness externally of and with the other half internally of the shoulder 139.

When at the setting of the tumbler in the lock the finger plate 45h is rocked, the first stop pawl 136 which hitherto has prevented the regulating member from moving axially, glides upwardly over the rounded edges of the recess 140 and on the cylindrical outer surface of the extension 134, when the regulating member can move axially through the influence of its spring 51h until the shoulder 139 abuts the next following stop pawl 136 which at its engaging end is kept pressed against the outer surface of the tube 39h and thus in locking position. The regulating member then moves axially a distance which is equal to half the thickness of the stop pawl. When the finger plate after said forward rotation is released and when through the influence of its spring 51h it has returned to its initial angular position, the recess 140 will register with the shoulder 138 on the next following stop pawl, and therefore the regulating member can move further a distance in axial direction, that is to say a distance equal to the axial length of the recess 140 or equal to half the thickness of the stop pawl. At repeated rotary movement of the finger plate the same cycle is repeated, until the regulating member with its shoulder 139 touches the bottom of the casing 131, when all stop pawls will have been moved up to the cylindrical outer surface of the extension 134.

For the purpose of restoring the regulating member to its axial initial position the carrying rod 132 is drawn out by means of the knob 141, the radial flange 142 then abutting the projection 143 on the extension 134 and carrying along the axially movable part of the regulating member.

Instead of arranging the regulating member so that it must be rotated for the purpose of setting the tumblers, it may be arranged to have rectilinear movement for the same purpose, the part of the regulating member which cooperates with tumblers will then be given a corresponding form. If this part has a rectilinear movement in the plane of the tumblers, it may preferably be formed with an inclined plane which is moved into engagement with the tumblers and on which the latter glide during setting. Such an arrangement which also falls under the scope of the present invention in its broadest aspect is exemplified in Figs. 21 and 23 of the drawings. In the embodiment shown the regulating member consists of a wedge 145 to be set by means of a shaft 144. The shaft 144 which is parallel with the shaft 16 of the tumblers 26 is guided at both its ends in straight-lined guides in the opposite walls of the housing 10, so that it may be displaced parallel with itself and with the bottom of the housing on which the underneath side of the wedge 145 rests. The wedge 145 is displaceably mounted on the shaft 144, so that it may move in the longitudinal direction of the latter. One end of the shaft 144 projects through a slot 146 in the wall of the housing and at this projecting end it is provided with a handle 147, by means of which the shaft 144 with the wedge 145 may be moved in the longitudinal direction of the slot for the purpose of setting the tumblers. The handle is provided with a pointer 148 which glides over a numbered scale indicating the setting positions 0—9 of the tumbler. A rectangular member 149 fixed to the shaft 144 extends partly into the guiding groove 150 on the interior of the wall of the housing and serves to guide the shaft during its displacement along the slot 146. A similar guiding device may be arranged at the opposite wall for the other end of the shaft 144. On that side of the member 149 which is turned towards the interior of the housing rests one end of a pressure spring 151, the other end of which rests on the opposing side of the wedge 145 and thus tends to move the wedge in longitudinal direction of the shaft 144. The pressure spring 151 may if necessary be surrounded by a tube 152 fixed to the wedge and serving as guide. At its point the wedge is provided with a projecting stop 153 intended to stop, in the same way as the stop member 52 on the cam disk described above, the wedge in operative position for setting the respective tumbler. For the purpose of restoring the wedge to its axial initial position, upon all tumblers having been set, a restoring rod 154 may in analogy with the preceding embodiment be actuated by means of a button 155 and may be arranged centrally in the shaft 144 which for this purpose is made hollow. A shoulder 156 on the inner end of the restoring rod 154 extends through a longitudinal slot 157 and through the hollow shaft 144 to cooperate with the inner surface of the wedge. At its back end the wedge is provided with a projecting shoulder 158 to cooperate with a corresponding shoulder 159 on the lock bolt 12.

It is obvious that the tumblers may in the same manner as described in connection with preceding embodiments be actuated by pawls which retain the same in the set position and that shoot-bolts and other details may be arranged in the same way as shown in preceding figures.

The mode of operation of the device just described is substantially the same as that described in connection with the embodiment shown in Figs. 1–6. The regulating member is shown in Fig. 22 in its initial position, in which the wedge is kept in operative position for the purpose of setting the first tumbler by means of the projection 153. If the tumblers for instance are executed to be set to respond to the combination number 503,915 the lock is opened in the following manner: The regulating member at first is moved by means of the handle 147 in longitudinal direction of the slot 146 until the pointer 148 registers with the number 5 on the scale. The lower corner of the first tumbler then glides along the upper surface of the wedge 145, and as this latter inclines in relation to the direction of movement of the wedge, the tumbler will be rocked about its shaft an angle corresponding to the length of said displacement, that is to say until the recess 58 will be opposite to the projection 18 on the bolt 12. The inclination of the upper surface of the wedge and the position of the recess 58 on the tumbler are of course so arranged that this will take place. When during this setting movement the wedge has been displaced to such an extent in relation to the tumbler that the shoulder 153 freely passes the lower corner of the tumbler, the wedge is moved a distance axially by the influence of the spring 151, until its front surface will rest on the next tumbler and be stopped by this latter. When the shaft 144 thereupon is manually returned from the position 5 to its initial position in the slot 146, the upper edge of the wedge will at the end of the movement pass freely the lower corner of the second tumbler and then the wedge is forced by the spring 151 to move axially into operative position in relation to this tumbler, in which position it is stopped as before by the shoulder 153. The next number 0 is to be taken in a similar manner and the same process will be repeated at the following tumbler as described in connection with the first and second tumbler. After all tumblers have been set in position the wedge is forced to a position below the bolt so that the projecting shoulder is able to engage the shoulder 159 on the bolt which may now be brought in its unlocking position by moving the wedge at the right as seen in Fig. 21.

I wish it to be understood that I do not desire to be limited to the exact details of construction shown and described, for obvious modifications will occur to a person skilled in the art.

What I claim is:—

1. A combination lock of the type including a plurality of adjustable tumblers for locking a bolt, and a setting member manually operable to set one tumbler at a time into desired position, characterized by the provision of means for automatically coupling said setting member to a succeeding tumbler upon the manual operation of the member to set the preceding tumbler.

2. A combination locking device comprising a plurality of tumblers, means operative to move all tumblers into predetermined initial positions when said device is locked, a setting member for manually adjusting said tumblers separately into desired positions, spring means tending to move said setting member into position to adjust the last of said tumblers, and means preventing such movement of the setting member, said last means being successively released by the movement of the tumblers out of their initial positions to permit said spring means to move said setting member into position to adjust the next succeeding tumbler.

3. In a combination lock, a plurality of axially alined and pivoted tumblers, means for latching the several tumblers in each of a plurality of set positions, means operable to restore all tumblers into alinement in a predetermined position, setting means including a member having an edge portion adapted to be displaced manually into engagement with said tumblers to set the same into desired positions, said edge portion of the member having a width sufficient to engage only one tumbler at a time, and means supporting said member for movement axially of said tumblers.

4. A combination lock as claimed in claim 3, in combination with means operable automatically upon the manual displacement of said member to set one tumbler to move said member axially of said tumblers and into position to engage a succeeding tumbler.

5. In a combination lock, the combination with a plurality of axially alined and pivoted tumblers, of setting means for adjusting said tumblers; said setting means comprising a member for selectively actuating the separate tumblers, means mounting said member for longitudinal movement into position to actuate the several tumblers, and means fixed against longitudinal movement and angularly adjustable to actuate said member to set said tumblers.

6. In a combination locking device, a plurality of pivoted tumblers each adjustable to a predetermined number of positions, and means for individually setting the several tumblers, said means including a member having a surface for sliding engagement with a tumbler to move the same, means operable manually to move said member over a path of such length as to set a tumbler into any one of its positions of adjustment, and means mounting said member for movement along another path to engage said member in turn with the several tumblers.

7. A combination locking device as claimed in claim 6, wherein said member is a helical cam having a peripheral surface for engaging the said tumblers.

8. In a combination lock, a bolt, a plurality of axially alined and pivotally mounted tumblers, means for returning all tumblers to predetermined initial positions when the bolt is projected, and manually operable means for individually imparting an angular movement to said tumblers; said means including a member having an edge portion for engagement with a tumbler to move the same and a shoulder for engagement with a tumbler standing in its initial position to aline the said edge portion with that tumbler, spring means tending to move said member axially of said tumblers in one direction, and means operable manually to move the said member axially in the opposite direction, whereby the said spring means moves said member into successive alinement with the several tumblers when said member is first moved manually into alinement with one end tumbler and then operated manually to set the said end tumbler and then successively the next adjacent tumblers.

9. A combination lock as claimed in claim 8, wherein said member is a helical cam.

10. A combination lock as claimed in claim 8, wherein said member is a helical cam rotatable about an axis spaced from the axis of said tumblers.

11. A combination lock as claimed in claim 8, wherein said member is a helical cam coaxial with said tumblers.

12. A combination lock as claimed in claim 8, wherein said means is a helical cam carried on a shaft member, means supporting said shaft member and cam for axial and rotary motion, an operating member adapted to be manually operated to rotate said shaft member and cam, and means preventing axial movement of said operating member.

13. A combination lock device of the type including a plurality of tumblers and means pivoting the same for tilting movement about a common axis, means operative upon the locking of the device to reset all of said tumblers into alinement in an initial position, and means for selectively setting the said tumblers, characterized by the fact that said setting means includes a member having an edge portion for engaging one tumbler at a time to set the same and a projection for engagement with a tumbler standing in initial position to prevent axial movement of the setting member in one direction, and means operable manually to move said member to set the tumbler which is engaged by the said projection, means for returning said member to a fixed position after a movement thereof by said manually operable means, said projection of the setting member being cleared by a tumbler standing in any but initial position, and means supporting said setting member for axial movement for the selective setting of successive tumblers into desired positions.

14. In a combination lock, a bolt, a plurality of tumblers pivoted on a common axis, a setting member and means supporting the same for movement axially of and into successive alinement with said tumblers, and means for imparting angular movement to said setting member to actuate the tumbler in alinement therewith, said means comprising an arc-shaped pivoted member having finger abutments corresponding in number to the positions into which said tumblers may be set.

15. In a combination lock, a shaft, a plurality of tumblers mounted on said shaft for individual pivotal movement, means tending to return all tumblers into an alined initial position, a setting member and means mounting the same for both axial and pivotal movement with respect to said shaft, said setting member having a portion for engagement with said tumblers one at a time to set the same in desired angular positions when said member is manually operated through a partial revolution, means for latching each tumbler in set position, stop means for arresting said setting member in predetermined angular position with respect to the said initial position of said tumblers after each manual operation of the setting member, and a projection on said setting member, said projection being axially alined with a portion of any tumbler standing in initial position when said setting member is in said predetermined angular position.

16. A combination lock as claimed in claim 15, wherein said setting member is an angular arm mounted on said shaft, and the said tumblers have openings therethrough, one wall of the said opening in each tumbler constituting a surface to be engaged by said setting member for imparting a pivotal movement to the tumbler, the said projection of the setting member projecting beyond the opening of a tumbler to engage the same.

17. A combination lock as claimed in claim 15, wherein said setting member is an angular arm mounted on said shaft, and the said tumblers have openings therethrough, one wall of the said opening in each tumbler constituting a surface to be engaged by said setting member for imparting a pivotal movement to the tumbler, and the said stop means comprises a member extending through the openings of said tumblers.

18. A combination lock as claimed in claim 15, wherein said setting member is an angular arm mounted on said shaft, and the said tumblers have openings therethrough, one wall of the said opening in each tumbler constituting a surface to be engaged by said setting member for imparting a pivotal movement to the tumbler, and said stop means is a channel member extending through the openings of said tumblers, one end portion of a flange of the channel being cut away to permit the projection of the setting member to enter the channel when all of said tumblers have been set into desired positions.

19. A combination lock comprising a bolt, a plurality of pivotally adjustable tumblers, means operable manually to set said tumblers successively into desired positions, said means including a member movable axially with respect to said tumblers for successively engaging the same, a handle for withdrawing the bolt, and means including said member and an element actuated by said handle for transmitting motion from said handle to said bolt, said member and element having cooperating parts which engage only after an axial movement of said setting member out of engagement with the last of said tumblers.

HERNFRID EVALD BERGGREN.